United States Patent [19]
Hanninen et al.

[11] Patent Number: 5,777,732
[45] Date of Patent: Jul. 7, 1998

[54] LUMINESCENCE-SCANNING MICROSCOPY PROCESS AND A LUMINESCENCE SCANNING MICROSCOPE UTILIZING PICOSECOND OR GREATER PULSE LASERS

[76] Inventors: Pekka Hanninen, Korkeavuorenkatu 2 as 25, 20100 Turku, Finland; Stefan Hell, Nadlerstr. 1, 69117 Heidelberg, Germany

[21] Appl. No.: 571,839

[22] PCT Filed: Apr. 27, 1995

[86] PCT No.: PCT/DE95/00566

§ 371 Date: Apr. 25, 1996

§ 102(e) Date: Apr. 25, 1996

[87] PCT Pub. No.: WO95/30166

PCT Pub. Date: Nov. 9, 1995

[30]     Foreign Application Priority Data

Apr. 28, 1994 [DE] Germany .................. 44 14 940.9

[51] Int. Cl.$^6$ ................................. G01N 21/64
[52] U.S. Cl. ........................ 356/318; 250/459.1
[58] Field of Search ............. 356/318; 250/459.1

[56]     References Cited

U.S. PATENT DOCUMENTS

| | | | |
|---|---|---|---|
| 5,022,757 | 6/1991 | Modell | 356/318 |
| 5,034,613 | 7/1991 | Denk et al. | 250/458.1 |
| 5,196,709 | 3/1993 | Berndt et al. | 356/318 X |
| 5,518,694 | 5/1996 | Bentsen | 250/458.1 X |

FOREIGN PATENT DOCUMENTS

| | | |
|---|---|---|
| 3505728 | 1/1989 | Germany . |
| 4035799 | 5/1992 | Germany . |

OTHER PUBLICATIONS

Sevens et al "Time Resolved Fluorescence Imaging of Europium Chelate Label in Immunothistochemistry and In Situ Hybridization", Cytometry 13: 1329-38, 1992.

Goppert-Mayer, M. Ann. Phys. 1931, 9:273.

Peticolas et al "Double Photon Excitation in Organic Crystals" Phys Review Letters vol. 10, No. 2, 43-45 15 Jan. 1963.

"Two Photon Excitation in Time-Resolved Fluorescence Microscopy", Pekka Hanninen, et al, University of Turku, Medical Physics, P.O. Box 123, SF-20521, Turku, Finland, SPIE vol. 2184 (7-8 Feb. 1994 pp. 66-71.

*Primary Examiner*—Vincent P. McGraw
*Attorney, Agent, or Firm*—Weingarten, Schurgin, Gagnebin & Hayes LLP

[57]     ABSTRACT

The description relates to a process for luminescence scanning microscopy with two-photon excitation, especially for examining biological objects (5). A laser pulse excites luminescent, especially fluorescing molecules and the luminescence emitted by the object (5) is measured and evaluated. In the process, the luminescent molecules in the object (5) are excited by laser pulses of over $10^{-12}$ second duration. A luminescence scanning microscope for implementing the process has a detector (2), a filter (7, 8) for separating the light emitted by the sample from the laser light (4) and a laser light source which is a laser (1) emitting pulsed or continuous radiation.

33 Claims, 1 Drawing Sheet

LUMINESCENCE-SCANNING MICROSCOPY PROCESS AND A LUMINESCENCE SCANNING MICROSCOPE UTILIZING PICOSECOND OR GREATER PULSE LASERS

FIELD OF THE INVENTION

The invention concerns a process for luminescence-scanning microscopy according to the introductory part of the principal claim and a luminescence-scanning microscope for carrying out this process.

BACKGROUND OF THE INVENTION

Such a process is known from U.S. Pat. No. 5,034,613. The described process concerns a process with two-photon excitation. An object to be examined, preferably a biological object, is treated with a luminescent, especially a fluorescing dye. The dye contained in the object is excited by the joint action of two photons and the light emitted by the dye recorded and evaluated. To cover the entire sample, the laser beam is scanned over the object. The values of all points on the object are recorded, making a three-dimensional representation of the results of evaluation possible. The two-photon excitation, in conjunction with the rasters, leads to as direct three-dimensional image of the object. To increase the probability of the two-photon excitation, use is made of laser pulses with a duration in the sub-picosecond range. Lasers which generate such extremely short pulses are very expensive. Moreover, biological objects are often destroyed by the high-output pulses. An excitation of the object with laser pulses in the sub-picosecond range often causes the luminescence signal to "collapse". This "collapse" can be envisioned as a "micro-explosion" which destroys the object material.

SUMMARY OF THE INVENTION

The problem addressed by the invention is to develop a generic process in such a way that the disadvantages cited above do not occur.

It was surprisingly discovered that a measurement of two-photon luminescence is possible with laser pulses of relatively long duration, or even with continuous light, and leads to good measurements. By excitation with laser pulses whose duration is longer than $10^{-12}$ seconds, or by excitation with continuous light, the output peaks in the excitation light are reduced to the point where the destruction of the object does not take place. A very advantageous range of the pulse length lies in the picosecond range. Because the laser pulses used exhibit a lower output than those in the sub-picosecond range, longer measuring times are used, the sensitivity of the detector employed being adapted to the conditions of measurement. It was found that the use of photon counting as the evaluation process yields good measurements. It is particularly advantageous if an avalanche photodiode is employed as the detector. The reception and evaluation of the measurement results are possible even with continuous laser light of moderate output. With an appropriately extended period of measurement and the selection of a detector with a high signal-noise ratio, the results are comparable to those with the process using laser pulses in the sub-picosecond range.

It is of particular advantage that commercial lasers with continuous or pulsed radiation can be used as the light source to carry out the invented process. These are not expensive. Ordinary semiconductor or gas lasers can be employed. Suitable as gas lasers are, in particular, HeNe lasers and krypton lasers. The laser arrangement can also be in the form of an array. The utilization of two or three lasers for illumination of the same object point has proven to be particularly advantageous.

As already stated above, it is essential that a detector with a high signal-noise ratio be used to receive and evaluate the luminescing light. It is of particular importance in that case that the detector used have a correspondingly high sensitivity and a small intrinsic noise. The arrangement of the lasers and detectors in the form of an array and the illumination and measurement of several points thus permitted provides the possibility of shortening the duration of the process. It is advantageous to arrange a beam-scanning device in front of the object, the beam being in that case scanned over the object.

Provision is also made in the case of the invented luminescence-scanning microscope for filters to separate the light emitted by the sample from the laser light. Instead of a filter, it is also possible to employ a detector which filters out the corresponding wavelength.

BRIEF DESCRIPTION OF THE DRAWING

A schematic representation of the luminescence-scanning microscope for implementation of the invented process is presented in FIG. 1;

a schematic representation of the luminescence-scanning microscope utilizing an array of lasers and an array of detectors is presented in FIG. 2.

DETAILED DESCRIPTION

Figure 1:
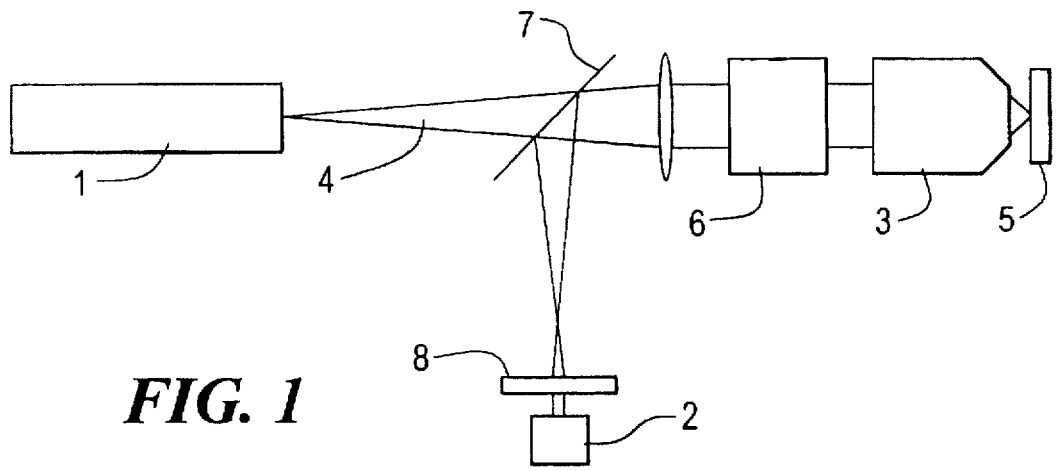
Figure 2:
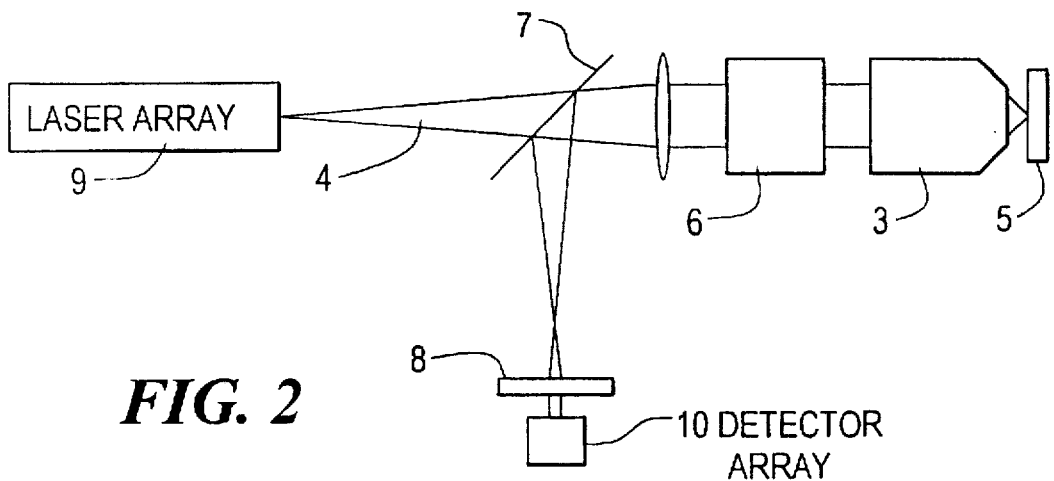

The luminescence-scanning microscope exhibits a laser 1 for the generation of the laser light, a photodetector 2 for evaluation of the readings and an objective 3 for focusing the laser beam 4, emitted by the laser-light source 1, onto the object 5 to be examined. The laser beam 4 is controlled by a scanning unit 6 for scanning the object 5. The luminescence-scanning microscope furthermore exhibits filters 7 and 8 for the separation of the laser light 4 from the luminescence light. Per the invention, the laser-light source 1 takes the form of a conventional laser with continuous or pulsed radiation. The laser-light source 1 can also be formed by the arrangement of the lasers into an array 9. The same holds true for the photodetector 2. The latter can be configured either as a point or an array 10. In the case of an array-arrangement of the lasers 9 and detectors 10, the latter, as well as the sample zone to be imaged, are respectively arranged in planes optically conjugated relative to one another for the simultaneous reception of several scanned points.

What is claimed is:

1. Process for luminescence-scanning microscopy with two-photon excitation of an object in which a laser pulse excites luminescing and/or fluorescing molecules of the object, and the luminescence light emitted by the object is measured and evaluated, wherein the excitation of the luminescing molecules present in the object results from laser pulses whose duration is greater than $10^{-12}$ seconds.

2. Process according to claim 1, wherein the evaluation of the light of luminescence emitted by the object (5) is accomplished in the process of photon counting.

3. Process according to claim 1, wherein several scanning points of the object (5) are excited simultaneously and the light of luminescence emitted by these scanning points evaluated simultaneously.

4. Process according to claim 1, wherein said measurement and evaluation step is implemented with a luminescence-scanning microscope comprising at least one laser-light source, at least one detector and at least one filter for the separation of the light emitted by the sample from the laser light, and wherein said at least one laser-light source is a laser (1) with pulsed radiation.

5. Luminescence-scanning microscope according to claim 4, wherein the laser is a semiconductor laser.

6. Luminescence-scanning microscope according to claim 4, wherein the laser is a gas laser.

7. Luminescence-scanning microscope according to claim 6, wherein the laser is an HeNe laser or a krypton-ion laser.

8. Luminescence-scanning microscope according to claim 4, wherein said at least one detector (2) is a high, signal-noise ratio detector.

9. Luminescence-scanning microscope according to claim 4, wherein said microscope further comprises a beam-scanning unit (6) for the controlled scanning of the object (5).

10. Luminescence-scanning microscope according to claim 4, wherein said at least one laser-light source comprises an array of lasers (1) and wherein said at least one detector comprises an array of detectors (2) arranged in an optically conjugated plane for the focusing of the object (5).

11. Luminescence-scanning microscope according to claim 4, wherein said at least one detector is an avalanche photodiode.

12. Process for luminescence-scanning microscopy with two-photon excitation of an object in which a laser pulse excites luminescing and/or fluorescing molecules of the object, and the luminescence light emitted by the object is measured and evaluated, wherein the excitation of the luminescing molecules present in the object results from laser pulses whose duration is $10^{-12}$ seconds.

13. Process according to claim 12, wherein the evaluation of the light of luminescence emitted by the object (5) is accomplished in the process of photon counting.

14. Process according to claim 12, wherein several scanning points of the object (5) are excited simultaneously and the light of luminescence emitted by these scanning points evaluated simultaneously.

15. Process according to claim 12, wherein said measurement and evaluation step is implemented with a luminescence-scanning microscope comprising at least one laser-light source, at least one detector and at least one filter for the separation of the light emitted by the sample from the laser light, and wherein said at least one laser light source is a laser (1) with pulsed radiation.

16. Luminescence-scanning microscope according to claim 15, wherein the laser is a semiconductor laser.

17. Luminescence-scanning microscope according to claim 15, wherein the laser is a gas laser.

18. Luminescence-scanning microscope according to claim 17, wherein the laser is an HeNe laser or a krypton-ion laser.

19. Luminescence-scanning microscope according to claim 15, wherein said at least one detector is a high signal-noise ratio detector.

20. Luminescence-scanning microscope according to claim 15, wherein said microscope further comprises a beam-scanning unit (6) for the controlled scanning of the object (5).

21. Luminescence-scanning microscope according to claim 15, wherein said at least one laser-light source comprises an array of lasers (1) and wherein said at least one detector comprises an array of detectors (2) arranged in an optically conjugated plane for the focusing of the object (5).

22. Luminescence-scanning microscope according to claim 15, wherein said at least one detector is an avalanche photodiode.

23. Process for luminescence-scanning microscopy with two-photon excitation for an object, in which a laser light excites luminescing and/or fluorescing molecules of the object, and the luminescence light emitted by the object is measured and evaluated, wherein the excitation of the luminescing molecules present in the object results from continuous laser light.

24. Process according to claim 23, wherein said measurement and evaluation step is implemented with a luminescence-scanning microscope comprising at least one laser-light source, at least one detector and at least one filter for the separation of the light emitted by the sample from the laser light, and wherein said at least one laser-light source is a laser (1) with continuous radiation.

25. Process according to claim 23 wherein the evaluation of the light of luminescence emitted by the object (5) is accomplished in the process of photon counting.

26. Process according to claim 23 wherein several scanning points of the object (5) are excited simultaneously and the light of luminescence emitted by these scanning points evaluated simultaneously.

27. Luminescence-scanning microscope according to claim 24, wherein the laser is a semiconductor laser.

28. Luminescence-scanning microscope according to claim 24, wherein the laser is a gas laser.

29. Luminescence-scanning microscope according to claim 28, wherein the laser is an HeNe laser or a krypton-ion laser.

30. Luminescence-scanning microscope according to claim 24, wherein said at least one detector is a high signal-noise ratio detector.

31. Luminescence-scanning microscope according to claim 24, wherein said microscope further comprises a beam-scanning unit (6) for the controlling scanning of the object (5).

32. Luminescence-scanning microscope according to claim 24, wherein said at least one laser-light source comprises an array of lasers (1) and wherein said at least one detector comprises an array of detectors (2) arranged in an optically conjugated plane for the focusing of the object (5).

33. Luminescence-scanning microscope according to claim 24, wherein said at least one detector is an avalanche photodiode.

* * * * *